A. S. BALLARD.
Earth-Augers.
No. 6,189.
Reissued Dec. 22, 1874.
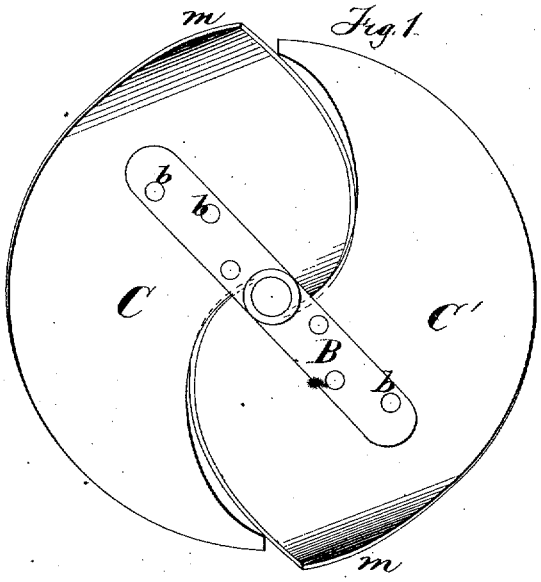
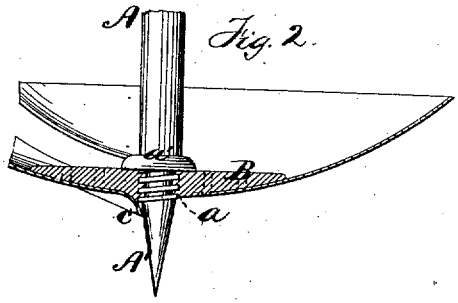
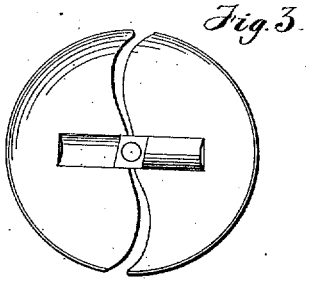
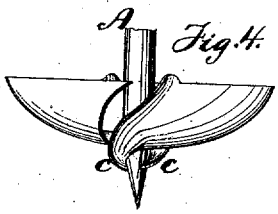
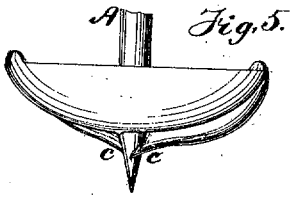
WITNESSES
M. Schumacher
R. H. Whittlesey
By
INVENTOR
Allen S. Ballard,
Hill & Ellsworth
Attorneys.
THE GRAPHIC CO. PHOTO-LITH. 39 & 41 PARK PLACE, N.Y.

UNITED STATES PATENT OFFICE.

ALLEN S. BALLARD, OF MOUNT PLEASANT, IOWA, ASSIGNOR OF ONE-HALF INTEREST TO HENRY S. CLARKE, OF SAME PLACE.

IMPROVEMENT IN EARTH-AUGERS.

Specification forming part of Letters Patent No. 30,175, dated September 25, 1860; extended seven years; reissue No. 6,189, dated December 22, 1874; application filed November 24, 1874.

*To all whom it may concern:*

Be it known that I, ALLEN S. BALLARD, of Mount Pleasant, in the county of Henry and State of Iowa, have invented a new and useful Improvement in the Manufacture of Earth-Augers; and I do hereby declare the following to be a full, clear, and exact description and specification thereof, reference being had to the accompanying drawings, forming a part of this specification, in which—

Figure 1 is a top plan view; Fig. 2, a vertical section; Fig. 3, a top plan, showing a modification of the cutting-edges; and Figs. 4 and 5, side elevations.

Similar letters of reference indicate the same parts.

My invention consists, first, in constructing the disk or cutting part of the auger of two separate plates or blades, secured together by a strong cross-bar, containing a socket or its equivalent for attaching the shaft or handle, the object being to reduce the original cost of manufacturing the instrument, and also to facilitate the removal and repair of the blades or bits when necessary, as well as to strengthen the auger and adapt it to the improved form of cutting-blade hereinafter described.

It consists, secondly, in curving the outer end of the cutting-edges backward from a radial line, so that when the bits or blades come in contact with a stone or other similar obstacle they will force such obstacle outward beyond their periphery, thus removing it altogether from the path of the instrument.

It consists, thirdly, in the employment of downwardly curved or inclined cutting-points on the blades, near the central axis of the instrument, constructed and arranged so as to enter the ground readily with the least possible expenditure of power by the operator, and to draw the auger down into the earth.

It consists, fourthly, in giving the outer edges of the blades such a curved and inclined form as will greatly increase their strength, thereby enabling them to be formed of thinner metal, so that they will cut through the dirt more readily and with the expenditure of less power by the operator, and so that they will be stronger and more durable than the old-fashioned blades. The curved and inclined form also assists the curved points *c c* to draw or force the auger into the ground without downward pressure upon it by the workman.

To enable others skilled in the art to make and use my invention, I will proceed to describe its construction and operation in detail by reference to the drawings.

A is the shaft of the auger; B, the brace or cross-bar above referred to, riveted to the bits or blades C C′ at *b b*, and having a thread cut in it to accommodate the screw *a* on the shaft A.

In the manufacture of my auger, the two plates are first stamped into the shape required, both plates being of the same form. These plates are arranged with relation to each other as shown in Figs. 1, 3, 4, 5, and are strongly secured together by means of the cross-bar or brace B. The leader A′ of the shaft A, which is pointed at its lower end, as shown, and provided with a projection, *a′*, and screw *a*, is then screwed into the threads in the brace cut for its reception, and the auger is ready for use. Thus constructed, with two cutting plates or blades united by a strong cross-piece, the auger can be made more cheaply, is stronger and more effective in use, can be more easily repaired, and when one of the blades becomes broken or badly injured while the other remains good, the injured one can be removed and another substituted without the loss of the good one. The blades of the auger should, for easy practical operation, be constructed so as to have a "drawing cut," and this is readily obtained by curving the cutting-edges in any suitable manner, as is shown in Figs. 1, 3. The backward curve of the cutting-edges, which operates to force stones and other small obstructions out of the path of the instrument, as above referred to, may be seen in any of the plan figures of the drawings. It forms a part of the curve for giving the drawing cut, and derives its second function, now under consideration, from the fact that it is located toward and at the outer extremity of the cutting-edge, and is so much inclined to a radial line as to operate upon the obstruction like an incline or wedge, and force it directly outward beyond the path of the blades. The drawing cut may be effected by causing the edge, from any given point, to sweep forward or backward from a radial line, but the removal of stones, &c., can only be effected by causing the outer part of the edges to sweep backward from such line. So far as the removal of stones, &c., is concerned, my invention includes only the curve or incline at the outer end sweeping backward from a radial line. The downwardly-inclined points to which reference has been made are shown at *c c*. These points are designed to loosen the earth around the shaft, so as to prevent friction upon it, and also to draw the auger down rapidly, without pressure from above. They are arranged near the center of the instrument, around the shaft, in order to operate upon the earth at that point, and also to increase the leverage of the handles and enable the instrument to be operated more easily. The upward curve of the outer edges of the blades is shown clearly in Fig. 1 at *m m*. The two results accomplished by thus curving the blades have been already sufficiently described.

I claim as my invention—

1. An earth-auger having the cutting-disk constructed in two separate parts, connected together by a strong cross-piece, substantially as and for the purpose described.

2. In an earth-auger the combination of the two bits or blades, the cross-bar, the socket, the point or leader, and the handle, substantially as and for the purpose described.

3. In an earth-auger the blades with the outer end of their cutting-edges curved back from a radial line, substantially as and for the purpose specified.

4. In an earth-auger the points *c c*, substantially as described, for the purposes set forth.

5. In an earth-auger the blades curved upward at their outer edges, for the purposes set forth.

6. In an earth-auger the blades curved downward at their inner end, and curved or inclined upward at their outer edges, substantially as and for the purposes described.

ALLEN S. BALLARD.

Witnesses:

HORACE CLARKE.

F. J. CLARKE.